United States Patent [19]

Gartside et al.

[11] 4,338,187

[45] Jul. 6, 1982

[54] SOLIDS FEEDING DEVICE AND SYSTEM

[75] Inventors: Robert J. Gartside, Auburndale, Mass.; Herman N. Woebcke, Stamford, Conn.

[73] Assignee: Stone & Webster Engineering Corporation, Boston, Mass.

[21] Appl. No.: 86,951

[22] Filed: Oct. 22, 1979

[51] Int. Cl.³ .............................................. C10G 9/30
[52] U.S. Cl. .................... 208/127; 208/148; 208/152; 208/153; 208/173; 406/137; 422/219
[58] Field of Search ............ 208/152, 153, 126, 127, 208/148, 173; 422/219; 406/136, 137, 144

[56] References Cited

U.S. PATENT DOCUMENTS

| | | | |
|---|---|---|---|
| 2,327,175 | 8/1943 | Conn | 422/219 |
| 2,518,842 | 8/1950 | Weber | 422/219 |
| 3,121,593 | 2/1964 | McIlvaine | 406/137 |
| 3,136,705 | 6/1964 | Sommers | 202/14 |
| 3,573,200 | 3/1971 | Vogel | 422/219 |
| 3,733,011 | 5/1973 | Driscoll | 406/136 |
| 3,826,738 | 7/1974 | Zenz | 208/153 |

Primary Examiner—Delbert E. Gantz
Assistant Examiner—William Leader
Attorney, Agent, or Firm—Hedman, Casella, Gibson & Costigan

[57] ABSTRACT

An apparatus and process for delivering fluidization gas to a bed of particulate solids to selectively locally fluidize the solids above a delivery conduit in communication with a reaction chamber. Also an apparatus and process for intimately mixing hydrocarbon feed with the particulate solids at the end of the delivery conduit in the reaction chamber.

6 Claims, 15 Drawing Figures

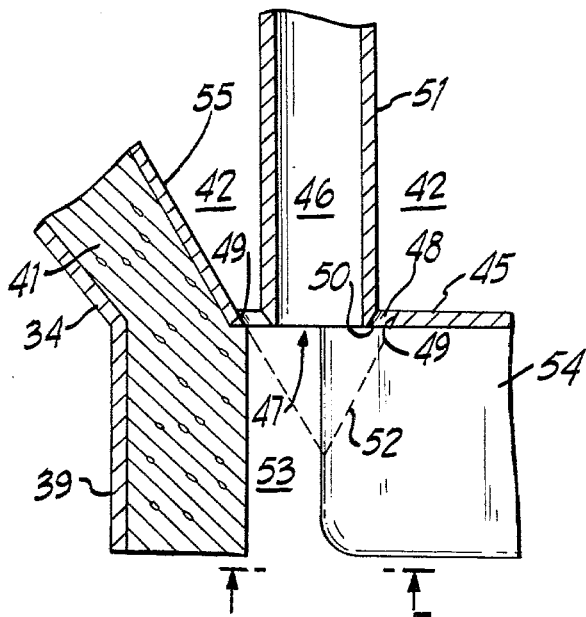
FIG. 2
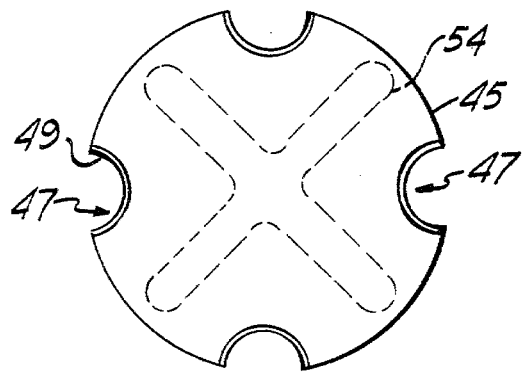
FIG. 3
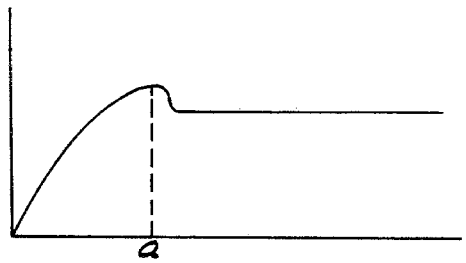
FIG. 4
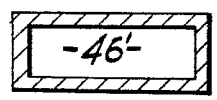
FIG. 6
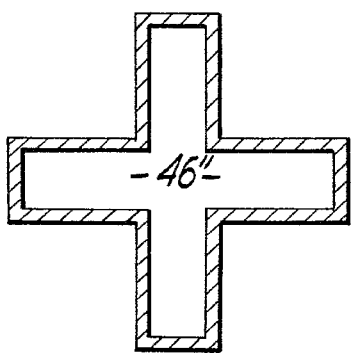
FIG. 7
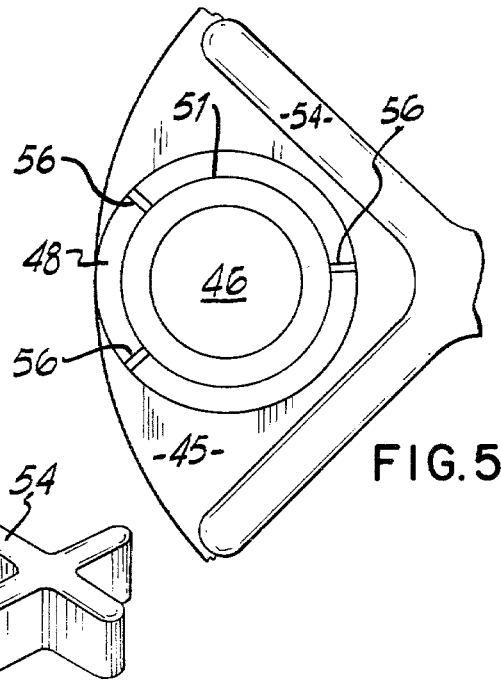
FIG. 5
FIG. 8

SOLIDS FEEDING DEVICE AND SYSTEM

BACKGROUND OF THE INVENTION

1. Field Of The Invention

The invention relates to both the delivery of particulate solids to a reaction chamber and to internally mixing the particulate solids and fluid, principally feed, at the reactor.

2. Description Of The Prior Art

Particulate solids are used in gas phase or liquid phase reactions for a variety of reasons. Typically, the particulate solids are present to catalytically accelerate (or rarely, decelerate) the rate of reaction. In still other reaction systems, solids are admixed and reacted with the fluid reactants. During the course of the reaction the solids participate in the reaction as a reactant and are depleted. Another use of particulate solids is to supply heat for the reaction. Hot inert solids are added to the reaction zone simultaneously with the gaseous reactants, the heat being transferred to the fluid medium by direct heat transfer. Conversely, the particulate solids may occasionally be employed to remove heat of reaction.

Typically, fixed bed and fluidized bed reactors are used to contact the solids with reactants. However, in reactions where reaction residence time is low, tubular reactors are used to create plugged flow velocity profiles. Such profiles prevent backmixing of the reactants, and ensure uniform reaction radially along the length of the tubular reaction zone. Gradients normal to the flow of material through the tubes are undesirable because such temperature and concentration variations interfere with the yield and distribution profiles from the reaction.

An example of the use of solids as a heat supply medium is illustrated in U.S. Pat. No. 4,061,562 to McKinney et al. which describes a process to react residual petroleum oils to produce olefins, particularly ethylene. In this system the reaction proceeds axially along the length of the riser reactor, the temperature gradually decreasing as endothermic heat of reaction is withdrawn therefrom.

In each of the systems described above, as well as other systems requiring the continuous addition of particulate solids, the means of feeding the solids to the reaction zone should satisfy two criteria. First, the flow of solids must be regulated. Generally, the solids flowrate is adjusted to re-establish the set point of a controlled parameter, such as temperature, pressure, density, concentration of a particular product in the effluent, and the like. In conventional thermal cracking processes, for example, it is common to control furnace coil outlet temperature to $+/-10°$ F. This is equivalent to a $+/-2\%$ variation in the heat input. Thus, McKinney's process would require control of the solids feed rate to approximately $+/-2\%$. The requirements for control of the flow rate of solids is influenced by the reaction time. For reaction times of less than one second, flow must be stable on a micro second level since the reaction times are less than the typical response times of conventional control means i.e., valves, etc.

Second, the solids feeding device should allow rapid and complete mixing of the solids and fluid phases. This is especially true where reaction residence times are low, as in thermal cracking. If mixing takes an appreciable percentage of the reactor residence time, concentration and temperature gradiants normal to the flow of material passing through the early stages of the reaction zone will create variations in reaction rate. Hence, product yields and distribution will be affected adversely. The present invention is an apparatus and a method for effecting flow control and uniform mixing of a particulate solids stream when introduced into a fluid stream.

Heretofore solids flow rate has been regulated in several ways using pneumatic or mechanical means. One method and system for facilitating the delivery of particulate solids to a reactor is to fluidize the entire bed of solids in the chamber feeding solids to the reactor. This system is attended by the use of valves and other regulation means to regulate the gas pressure above the bed.

However, fluidized beds characteristically have poor control over bed height so that control of the flow through the orifice is similarly poor. The bed has fluid characteristics and the fluctuations in bed height, bed density, and overhead pressure are transmitted uniformly throughout the fluidized bed essentially instantaneously. Hence, the pressure above the orifice constantly varies, and the resultant variations in orifice pressure differential cannot be compensated for because recovery time is often too long. Thus, variations in solids flow to the reaction zone is inherent in this flow control system.

A second method used to deliver solids to a tubular reactor relies on pneumatic transport gas injected into a lift leg located between the reservoir and the reactor. By varying the transport gas flow rate to the lift leg, the density of material in the lift leg is regulated thereby controlling the back pressure through the orifice which provides communication between the lift leg and the reservoir. This system has the disadvantage of generating gas bubbles in the lift leg which produces fluctuations in the solids flowrate.

Control is further comprised in this system because the high rate of aeration gas necessary to transport the solids is a negative influence on the rapid and uniform mixing of the solids and feed streams in the mixing zone at the top section of the reactor. In addition, large quantities of transport gas entering the reactor necessitate the use of over-sized reaction chambers to accommodate the inert aeration gas medium.

The third method employs mechanical valves to physically alter solids flowrate. Generally, valves are single or double disk types, the latter being preferred where uniformity of mixing is desirable. However, there is considerable erosion of the valve seat by the solids in each of these valves. These valves, therefore, must be replaced frequently, and have other maintenance problems associated with sealing the valves and properly maintaining and ascertaining the variable response that occurs as the valve seat erodes.

None of these three methods is particularly compatible with the operation necessary for the rapid and uniform mixing of the phases in low residence time reaction systems.

SUMMARY OF INVENTION

It is an object of the present invention to regulate the rate of solids added continuously to a solids-fluid reaction system, the solids participating in the reaction as a reactant, catalyst, or inert heat supply medium.

It is a further object of the invention to provide a method and apparatus for the regulation of solids flow to the solids-fluid reaction equipment.

It is also an object of the invention to provide an apparatus to regulate the flow of solids to said reaction system, which has no movable parts, and therefore, is less subject to rapid erosion by the solids.

It is an additional object of the apparatus of this invention to mix rapidly and uniformly the regulated flow of solids with the fluid reactants in the reaction zone.

A further aspect of this invention is to afford an apparatus and system to regulate the continuous flow of solids to the reaction zone and to mix said solids rapidly and uniformly with other components introduced simultaneously therein to produce a homogeneous reacting phase.

These and other advantages and objects of the present invention will be analyzed below.

The present invention is an apparatus and method for continuously feeding particulate solids to a reaction chamber or zone at a controlled rate of flow, and for admixing the solids with fluid simultaneously introduced to the reaction zone. This invention utilizes one or more conduits, preferably tubular, to transfer the solids from a solids reservoir chamber to the reaction chamber at a controlled rate of flow, said conduits being in open communication with both the reservoir chamber and with the reaction chamber. The conduits are in the nature of orifices, and are symmetrically located across the reactor cross section, said orifices or conduits also being specially oriented with respect to the fluid reactant inlet to promote rapid and intimate mixing of the two phases. The fluid reactants are added to the reaction system preferably through an annular orifice surrounding each tubular conduit. Preferably, these reactants are introduced angularly to the flow of solids such that the projection of the reactant flow path forms a cone, the vertex of which is below the conduit outlet. While an annular orifice is preferred, it is not inconsistent with the system to utilize in lieu of the annular orifice, a multiplicity of inlet tubes spaced at equal intervals around the conduit. By adding the solids and the reactant fluid in this manner very rapid mixing is achieved.

Mixing is enhanced by the use of a plurality of tubular conduits each conduit being surrounded by an annular orifice for gas flow. This occurs because the use of multiple tubular conduits greatly increases the shear surface/flow area ratio, which is an important criterion for good mixing. Perfect mixing is obtained when this ratio is infinite.

Mixing is further increased by reducing flow area by means of plugs extending into the region of mixing within the reaction chamber.

It is desirable to regulate the flow in this system to below +/−5%, preferably below +/−2%. To achieve this close control on solids flow rate, the dampening characteristics of a non-fluidized bed are employed simultaneously with the flow relationships which are inherent with fluidized bed control systems previously discussed. The essential feature of the control system is the localized fluidization of the solids just above the conduit inlet. In no instance is the amount of fluidization gas sufficient to fluidize the entire bed of solids in the reservoir. Rather, the amount of gas added is sufficient to only locally fluidize those solids in the region of the conduit inlet.

Fluidized bed solids generally flow through an orifice or conduit subject to the function:

$$G_s = f(\Delta P_{orifice})^{\frac{1}{2}}$$

where $\Delta P_{orifice}$ is equal to $P_{bed} + \rho_{bed} \cdot h_{bed} - P_{reactor}$.

"$G_s$" represents the gravity flow through an orifice and "f" indicates that the flow is a function of the stated variables. $\Delta P$ represents the change in pressure at the orifice and $h_{bed}$ is equal to the height of the bed.

$\rho$ is the density of the fluidized bed. Thus, from the formula it can be seen that the flow of solids through an orifice is a function of the pressure of the bed and the combined density and height of the bed less the pressure of the reactor into which the solids are flowing.

As a result the conventional fluidized systems depend on controlling the system pressure, the density of the bed and the height of the bed to achieve good solids flow control. These conventional systems therefore are difficult to control. The present apparatus and process eliminates the bed density as a major factor and minimizes the bed height as a factor.

DESCRIPTION OF DRAWINGS

FIG. 2 is an enlarged view of the intersection of the solid and gas phases within the mixing zone of the reaction chamber.

FIG. 3 is a top view of the preferred plate geometry, said plate serving as the base of the gas distribution chamber.

FIG. 4 is a graph of the relationship between bed density, pressure drop, bed height and aeration gas velocity in a fluidized bed.

FIG. 5 is a view through line 5—5 of FIG. 2.

FIG. 6 is a modified solids conduit having a rectangular cross-section.

FIG. 7 is another modification of the solids conduit having a cruciform cross-section.

FIG. 8 is an isometric view of the plug which extends into the mixing zone to reduce flow area.

DESCRIPTION OF PREFERRED EMBODIMENT

Figure 1:
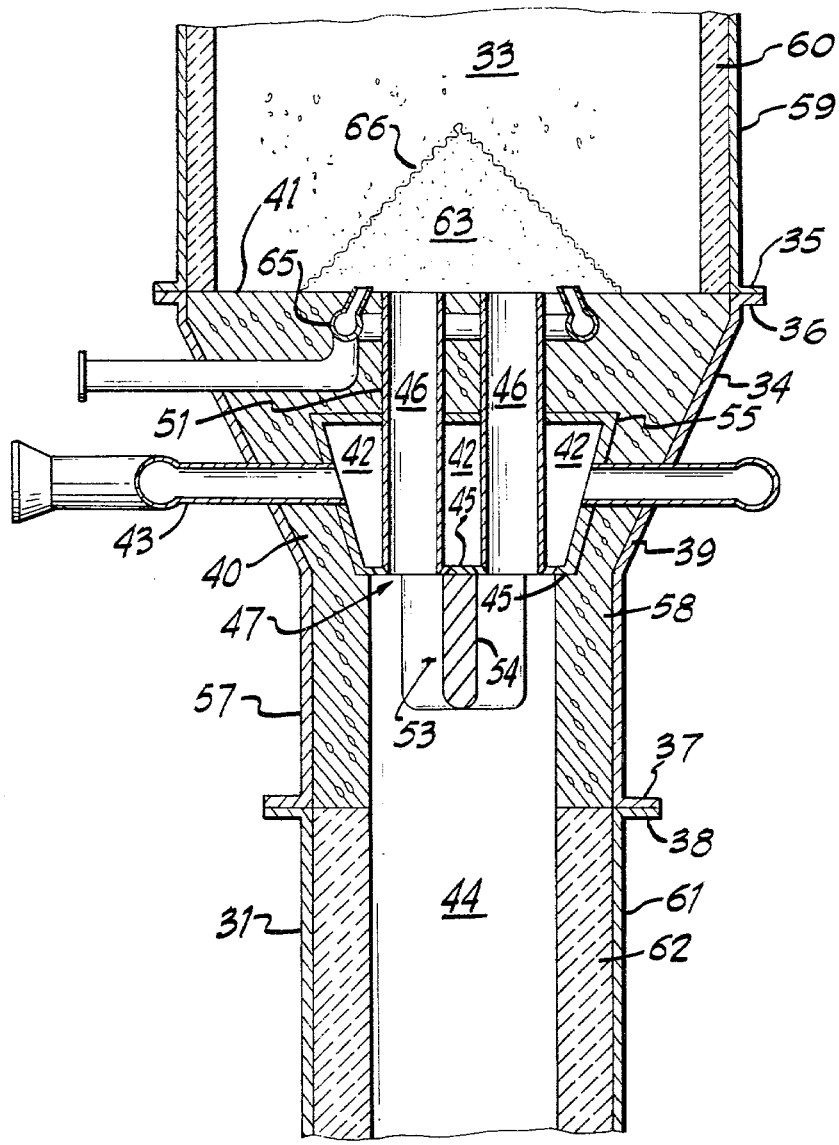
FIG. 1 is a cross sectional elevational view of the preferred embodiment of the invention as applied to tubular reactors and for use with gaseous feeds.

In FIG. 1 the preferred embodiment of the invention is shown installed for use with a tubular or plug flow reactor 31. It is to be understood that the invention has application in solid-fluid reaction systems which employ reactor geometries other than tubular. Indeed, the novel particulate solids metering and mixing device has application in generalized systems where the flow of particulate solids must be regulated and subsequently admixed with a fluid stream. The invention is suitable for use in connection with both a gas and a liquid feed.

Structurally, the apparatus comprises a solids reservoir vessel 33 and a housing 34 for the internal elements described below. The housing 34 is conically shaped in the embodiment of FIG. 1 and serves as a transition spool piece between the reservoir 33 and the reactor 31 to which it is flangeably connected via flanges 35, 36, 37 and 38. The particular geometry of the housing is functional rather than critical. The housing is itself comprised of an outer metallic shell 39, preferably of steel, and an inner core 40 of a castable ceramic material. It is convenient that the material of the core 40 forms the base 41 of the reservoir 33.

Set into and supported by the inner core 40 is a gas distribution chamber 42, said chamber being supplied with gaseous feed from a header 43. While the chamber 42 may be of unitary construction, it is preferred that the base separating the chamber 42 from reaction zone 44 be a removable plate 45. One or more conduits 46 extend downwardly from the reservoir 33 to the reaction zone 44, passing through the base 41 and the chamber 42. The conduits 46 are in open communication with both the reservoir 33 and the reaction zone 44 providing thereby a path for the flow of solids from the reservoir 33 to the reaction zone 44. The conduits 46 are supported by the material of the core 40, and terminate coplanarly with a plate 45, which has apertures 47 to receive the conduits 46. The region immediately below the plate 45 is hereinafter referred to as a mixing zone 53 which is also part of the reaction zone 44.

As shown in FIG. 2, an enlarged partial view of the intersection of the conduit 46 and the plate 45, the apertures 47 are larger than the outside dimension of conduits 46, forming therebetween annular orifices 48 for the passage of gaseous feed from the chamber 42. Edges 49 of the apertures 47 are preferably convergently beveled, as are the edges 50 at the tip of the conduit wall 51. In this way the gaseous stream from the chamber 42 is angularly injected into the mixing zone 53 and intercepts the solids phase flowing from conduits 46. A projection of the gas flow would form a cone shown by dotted lines 52 the vortex of which is beneath the flow path of the solids. By introducing the gas phase angularly, the two phases are mixed rapidly and uniformly, and form a homogeneous reaction phase. The mixing of a solid phase with a gaseous phase is a function of the shear surface between the solids and gas phases, and the flow area. A ratio of shear surface to flow area (S/A) of infinity defines perfect mixing; poorest mixing occurs when the solids are introduced at the wall of the reaction zone. In the system of the present invention, the gas stream is introduced annularly to the solids which ensures high shear surface. By also adding the gas phase transversely through an annular feed means, as in the preferred embodiment, penetration of the phases is obtained and even faster mixing results. By using a plurality of annular gas feed points and a plurality of solid feed conduits, even greater mixing is more rapidly promoted, since the surface to area ratio for a constant solids flow area is increased. Mixing is also a known function of the L/D of the mixing zone. A plug creates an effectively reduced diameter D in a constant L, thus increasing mixing.

The Plug 54, which extends downwardly from plate 45, as shown in FIGS. 1 and 2, reduces the flow area, and forms discrete mixing zones 53. The combination of annular gas addition around each solids feed point and a confined discrete mixing zone greatly enhances the conditions for mixing. Using this preferred embodiment, the time required to obtain an essentially homogeneous reaction phase in the reaction zone 44 is quite low. Thus, this preferred method of gas and solids addition can be used in reaction systems having a residence time below 1 second, and even below 100 milliseconds. In such reactions the mixing step must be performed in a fraction of the total residence time, generally under 20% thereof. If this criteria is not achieved, localized and uncontrolled reaction occurs which deleteriously affects the product yield and distribution. This is caused by the maldistribution of solids normal to the flow through the reaction zone 44 thereby creating temperature and or concentration gradients therein.

The flow area is further reduced by placing the apertures 47 as close to the walls of the mixing zone 53 as possible. FIG. 3 shows the top view of plate 45 having incomplete circular apertures 47 symmetrically spaced along the circumference. The plug 54, shown by the dotted lines, is below the plate, and establishes the discrete mixing zones 53 described above. In this embodiment, the apertures 47 are completed by the side walls 55 of gas distribution chamber 42 as shown in FIG. 2. In order to prevent movement of conduits 46 by vibration and to retain the uniform width of the annular orifices 48, spacers 56 are used as shown in FIG. 5. However, the conduits 46 are primarily supported within the housing 34 by the material of the core 40 as stated above.

The geometry of the conduits 46 and plug 54 is not limited to the circular shapes used illustratively in the description and drawings. Rectangular, or cruciform conduit geometries 46' and 46" shown in FIGS. 6 and 7 can be used, the orifice 48 conforming circumferentially to these geometries. Similarly, the plug 54 shown in perspective in FIG. 8, can assume various cross-sectional configurations. The plug 54 serves to reduce the flow area and define discrete mixing zones 53. The plug 54 may also be convergently tapered so that there is a gradual increase in the flow area of the mixing zone 53 until the mixing zone merges with remainder of the reaction zone 44. Alternatively, a plurality of plugs 54 can be used to obtain a mixing zone 53 of the desired geometric configuration.

Referring again to FIG. 1, the housing 34 may preferably contain a neck portion 57 with corresponding lining 58 of the castable ceramic material and a flange 37 to cooperate with a flange 38 on the reaction chamber 31 to mount the neck portion 57. This neck portion 57 defines and contains the mixing zone 53, and allows complete removal of the housing 34 without disassembly of the reactor 31 or the solids reservoir 33. Thus, installation, removal and maintenance can be accomplished easily. Ceramic linings 60 and 62 on the reservoir 33 and the reactor walls 59 and 61 respectively are provided to prevent erosion.

The solids in reservoir 33 are not fluidized except solids 63 in the vicinity of conduits 46. Aeration gas to locally fluidize the solids 63 is supplied by nozzles 64 symmetrically placed around the conduits 46. Gas to nozzles 64 is supplied by a header 65. Preferably, the header 65 is set within the castable material of the core 40, but this is dependent on whether there is sufficient space in the housing 34. A large mesh screen 66 is placed over the inlets of the conduit 64 to prevent debris and large particles from entering the reaction zone 44 or blocking the passage of the particulate solids through the conduits 46.

By locally fluidizing the solids 63, the solids 63 assume the characteristics of a fluid, and will flow through the conduits 46. The conduits 46 have a fixed cross sectional area, and serve as orifices having a specific response to a change in orifice pressure drop. Generally, the flow of fluidized solids through an orifice is a function of the pressure drop through the orifice. That orifice pressure drop, in turn, is a function of bed height, bed density, and system pressure.

However, in the process and apparatus of this invention the bulk of the solids in reservoir 33 are not fluidized. Thus, static pressure changes caused by variations in bed height are only slowly communicated to the inlet of the conduit 46. Also the bed density remains approximately constant until the point of incipient fluidization is reached, that is, point a of FIG. 4. In the present invention, however, it is essential that the amount of aeration gas be below that amount. Any aeration gas flow above that at point a on FIG. 4 will effectively provide a fluidized bed and thereby lose the benefits of this invention. By adjustment of the aeration gas flowrate, the pressure drop across the non-fluidized bed can be varied. Accordingly, the pressure drop across the orifice is regulated and the flow of solids thereby regulated as shown in FIG. 4. At gas flow rates below incipient fluidization, significant pressure increases above the orifice can be obtained without fluidizing the bulk of the solids. Any effect which the bed height and the bed density variations have on mass flow are dampened considerably by the presence of the non-fluidized reservoir solids and are essentially eliminated as a significant factor. Further the control provided by this invention affords rapid response to changes in solids mass flow regardless of the cause.

Together with the rapid mixing features described above, the present invention offers an integrated system for feeding particulate solids to a reactor or vessel, especially to a tubular reactor wherein very low reaction residence times are encountered.

Figure 9:
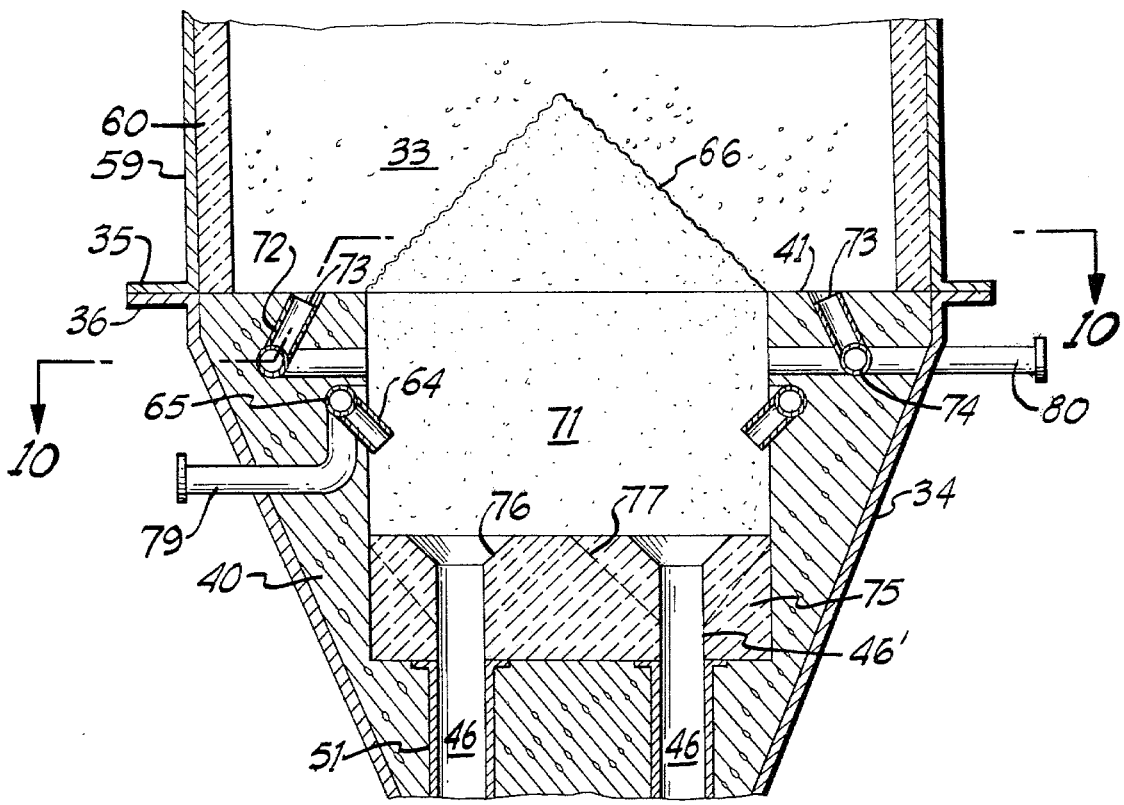
FIG. 9 is an alternate preferred embodiment of the control features of the present invention.
Figure 10:
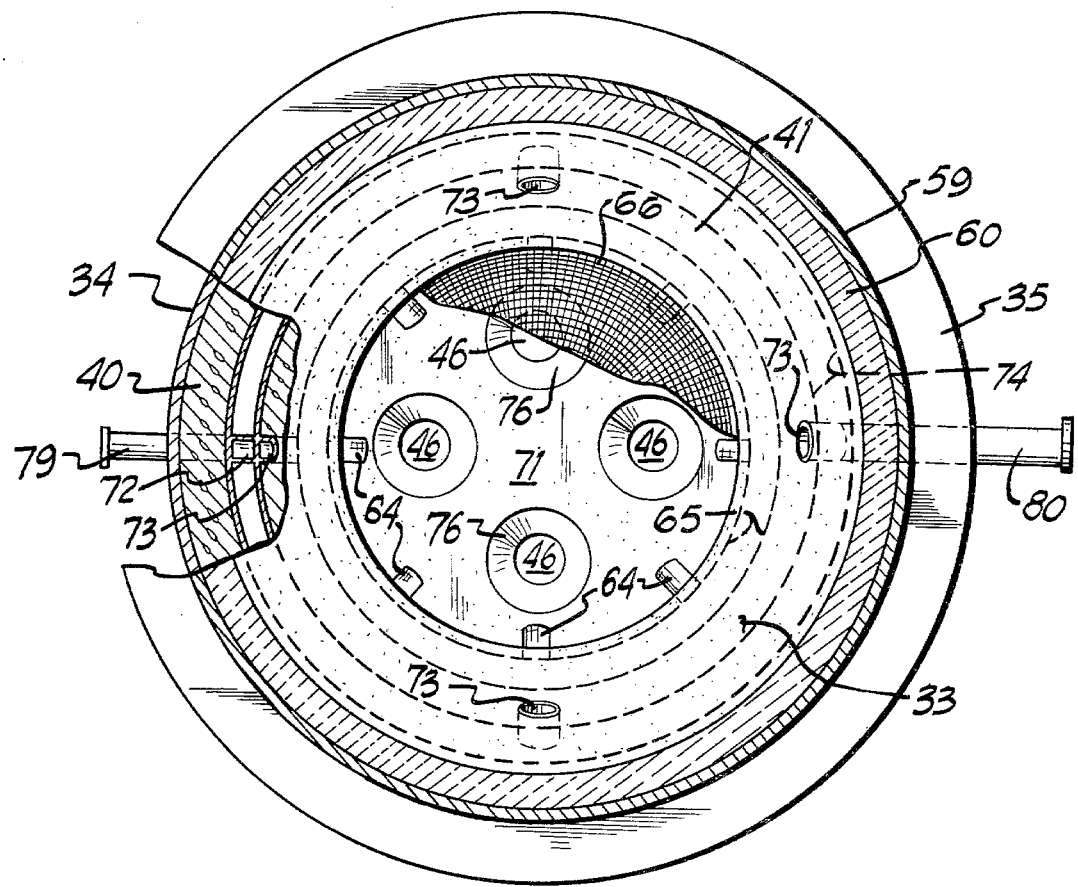
FIG. 10 is a view along line 10—10 of FIG. 9 showing the header and piping arrangements supplying aeration gas to the clean out and fluidization nozzles.

FIGS. 9 and 10 depict an alternate preferred embodiment of the control features of the present invention. In this embodiment the reservoir 33 extends downwardly into the core material 40 to form a secondary or control reservoir 71. The screen 66 is positioned over the entire control reservoir 71. The aeration nozzles 64 project downwardly to fluidize essentially these solids 63 beneath the screen 66. The bottom 41 of the reservoir 33 is again preferably formed of the same material as the core 40.

A plurality of clean out nozzles 72 are preferably provided to allow for an intermittent aeration gas discharge which removes debris and large particles that may have accumulated on the screen 66. Porous stone filters 73 prevent solids from entering the nozzles 72. Headers 65 and 74 provide the gas supply to nozzles 64 and 72 respectively.

The conduits 46 communicate with the reservoir 71 through leading section 46'. The leading sections 46' are formed in a block 75 made of castable erosion resistent ceramic material such as Carborundum Alfrax 201. The block 75 is removable, and can be replaced if eroded. The entrance 76 to each section 46' can be sloped to allow solids to enter more easily. In addition to being erosion resistent, the block 75 provides greater longevity because erosion may occur without loss of the present response function. Thus, even if the conduit leading sections 46' erode as depicted by dotted lines 77, the remaining leading section 46' will still provide a known orifice size and pressure drop response. The conduits 46 are completed as before using erosion resistent metal tubes 51, said tubes being set into core material 40 and affixed to the block 75.

FIG. 10 is a plan view of FIG. 9 along section 10—10 showing an arrangement for the nozzles 64 and 72, and the headers 65 and 74. Gas is supplied to the headers 65 and 74 through feed lines 79 and 80 respectively, which extend out beyond the shell 34. It is not necessary that the headers be set into the material of the core 40, although this is a convenience from the fabrication standpoint. Uniform flow distribution to each of the nozzles is ensured by the hydraulics of the nozzles themselves, and does not require other devices such as an orifice or venturi. The gas supplied to feed lines 79 and 80 is regulated via valve means not shown.

Figure 11:
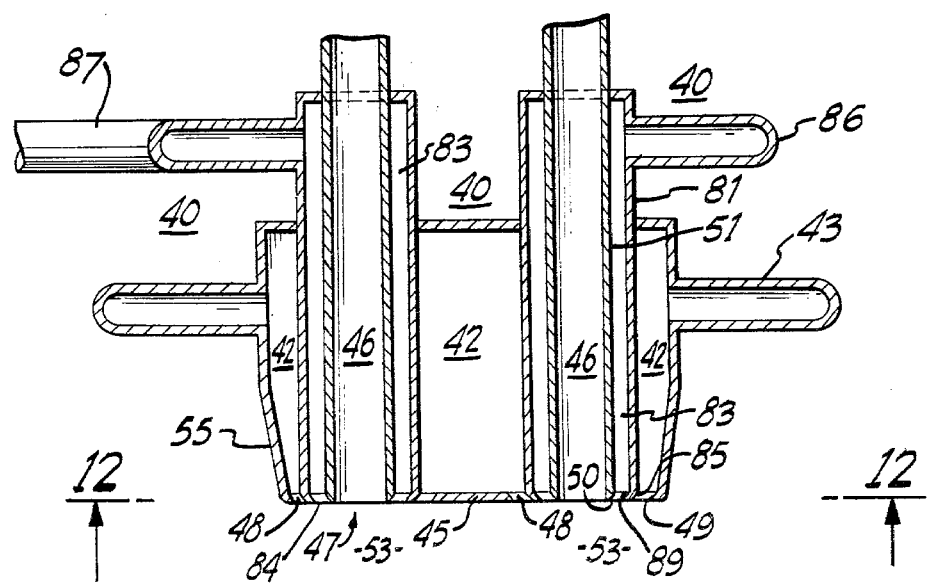
FIG. 11 is an alternate embodiment of the preferred invention wherein a second feed gas is contemplated.
Figure 12:
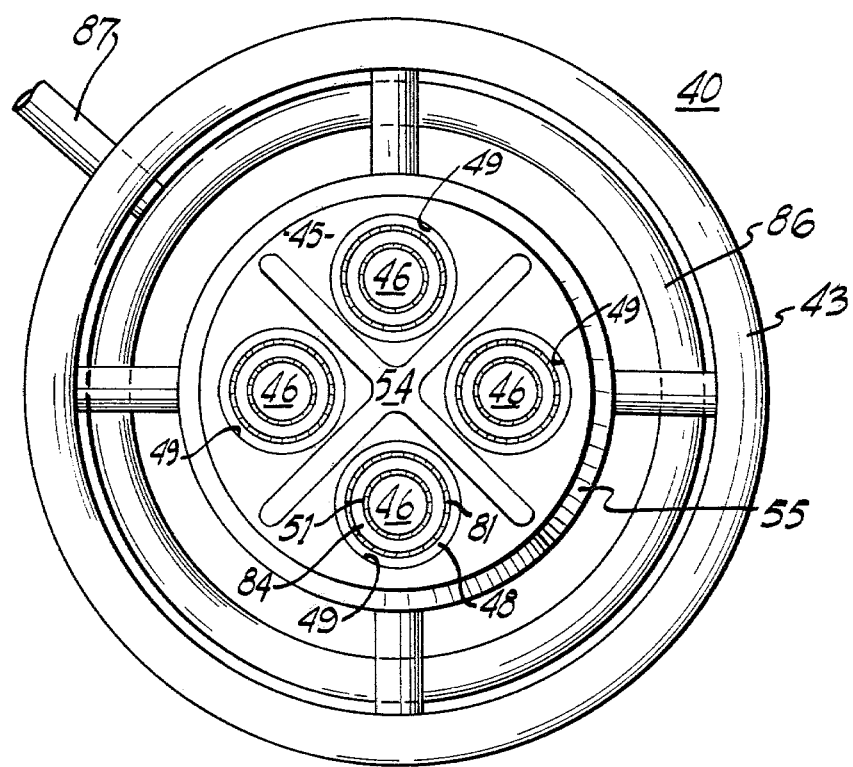
FIG. 12 is a view of the apparatus of FIG. 11 through line 12—12 of FIG. 11.

FIGS. 11 and 12 show the pertinent parts of an alternate embodiment of the invention wherein a second gas distribution assembly for feed gas is contemplated. As in the other embodiments, a gas distribution chamber 42 terminating in annular orifice 48 surrounds each solids delivery conduit 46. However, rather than a common wall between the chamber 42 and the conduit 46, a second annulus 83 is formed between the chamber 42 and the conduit 46. Walls 81 and 51 define the chambers 83. Feed is introduced through both the annular opening 48 in the chamber 42 and the annular opening 84 in the annulus 83 at an angle to the flow of solids from the conduits 46. The angular entry of the feed gas to the mixing zone 53 is provided by beveled walls 49 and 85, which define the openings 48 and beveled walls 50 and 89 which define the openings 84. Gas is introduced to the annulus 83 through the header 86, the header being set into the core 40 if convenient.

FIG. 12 is a plan view of the apparatus of FIG. 11 through section 12—12 showing the conduit openings and the annular feed openings 48 and 84. Gas is supplied through feed lines 87 to the headers 43 and 86 and ultimately to the mixing zones through the annular openings. Uniform flow from the chambers 42 and 83 is ensured by the annular orifices 48 and 84. Therefore, it is not essential that flow distribution means such as venturis or orifices be included in the header 43. The plug 54 is shaped symetrically to define discrete mixing zones 53.

Figure 13:
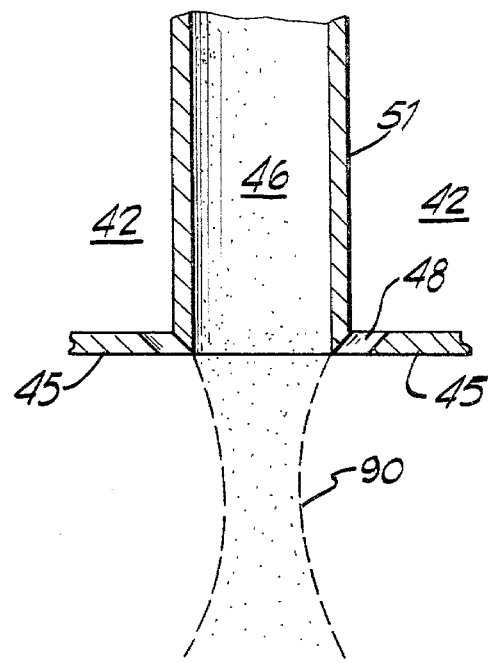
FIG. 13 is a pictorial representation of the mixing pattern in the mixing zone.

Mixing efficiency is also dependent upon the velocities of the gas and solid phases. The solids flow through the conduits 46 in dense phase flow at mass velocities from preferably 200 to 500 pounds/sq. ft./sec., although mass velocities between 50 and 1000 pounds/sq. ft./sec., may be used depending on the characteristics of the solids used. The flow pattern of the solids in the absence of gas is a slowly diverging cone. With the introduction of the gas phase through the annular orifices 48 at velocities between 30 and 800 ft./sec., the solids develop a hyperbolic flow pattern shown in FIG. 13 which has a high degree of shear surface illustrated by the dotted lines 90. Preferably, the gas velocity though the orifices 48 is between 125 and 250 ft./sec. Higher velocities are not preferred because erosion is accelerated; lower velocities are not preferred because the hyperbolic shear surface is less developed.

The initial superficial velocity of the two phases in the mixing zone 53 is preferably about 20 to 80 ft./sec., although this velocity changes rapidly in many reaction systems, such as thermal cracking, as the gaseous reaction products are formed. The actual average velocity through the mixing zone 53 and the reaction zone 44 is a process consideration, the velocity being a function of the allowed residence time therethrough.

By employing the solid feed device and method of the present inventions, the mixing length to diameter ratio necessary to intimately mix the two phases is greatly reduced. This ratio is used as an informal criteria which defines good mixing. Generally, an L/D (length/dia.) ratio of from 10 to 40 is required. Using the device disclosed herein, this ratio is less than 5, with ratios less than 1.0 being possible. Well designed mixing devices of the present invention may even achieve essentially complete mixing at L/D ratios less than 0.5.

Thus, in an 8" diameter tubular reactor, with an average superficial velocity in the mixing zone 53 of about 50 ft./sec., it is possible to obtain good mixing in one diameter of length. This corresponds to a mixing time of about 13 milliseconds. For an 8" diameter reactor having a 2" diameter centrally located plug, the equivalent diameter is 6", and the mixing time is further reduced to about 10 milliseconds.

Figure 14:
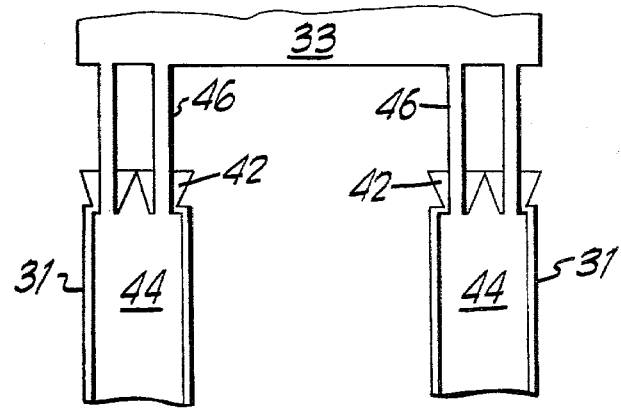
FIG. 14 is a schematic representation of the preferred embodiment as used with a plurality of reaction chambers.

The apparatus may also be used to feed solids to a plurality of reaction chambers 31 from a common reservoir 33, as illustrated schematically in FIG. 14. In this embodiment, each reactor chamber 31 is fed through one or more conduits 46. Individual distribution chambers 42 can be used for each reaction chamber as shown in FIG. 14. Alternatively, a common chamber 42 may be used to feed a common reactant. The latter embodiment is used when high throughput capacity is required, but a single reaction chamber is not feasible due to residence time limitations. This embodiment may also be used where the feed is common, but the reaction conditions are different. However, capital costs are reduced by using the common elements described. The former embodiment allows different gaseous feedstocks to be treated at optimum reaction conditions.

For example, the thermal cracking of a hydrocarbon to produce ethylene may use as feedstock a light hydrocarbon gas such as ethane or propane, or a gasified petroleum gas oil such naphtha. The optimum production of ethylene requires that these feeds be treated individually and at different operating conditions. Using the embodiment of FIG. 14, this may be accomplished.

Figure 15:
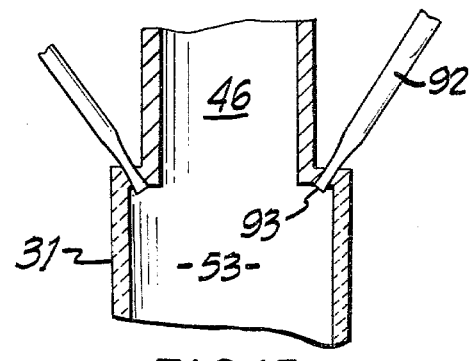
FIG. 15 is a form of the preferred embodiment of the present invention adapted for use with a liquid phase feed.

FIG. 15 is the preferred embodiment when admixing a liquid phase with a particulate solid stream. The liquids are introduced to the mixing zone 53 through a plurality of tubes 92 spaced around the conduit 46. An annular orifice 48 is not required. Each tube outlet is provided with an injection nozzle 93 which atomizes the liquid feed prior to entry into the mixing zone. Preferably, these tubes are angled so that the liquid feed impinges directly onto the outflowing solids.

Practice has taught that local fluidization can be effected using the apparatus of FIG. 1 in essentially any fluid bed environment.

In one illustration of the increased stability benefits pertaining to solids flow, a solid bed having a bed height of 10 feet, a bed density of 43 lb./ft.$^3$ in which the bed is comprised of FCC type solids having a 30 to 70 micron particle size, 47.2 ACFM was directed through the nozzles 64 to the zone 63 above the conduits 46. The pressures above the bed level and below the orifice were being held constant at 20 psia. The flow rate of solids under these conditions was 14.4 lb./sec. through a three inch orifice. In order to achieve a flow control of ±2% the flow of aeration gas has to be controlled within +/−2% or +/−0.94 ACFM. This can be easily achieved in small diameter piping with rapid response values.

Under conventional conditions, the same bed 10 feet in height and 10 feet in diameter would add aeration gas sufficient to fluidize the bed to a density of 35 lb./ft.$^3$. A total of 472 ACFM of gas is required to reach a fluidizing velocity of 0.1 fps. Under these conditions, the fluid bed will generate a pressure drop across the orifice equal to 2.43 psi. In order to have the same flow rate of 14.4 lb./sec. the orifice must be 2.6 inches in diameter (slightly smaller than the locally fluidized case). However, in order to achieve the same control over solids flow, the overhead pressure, bed height and density must be controlled to a combined deviation of +/−2%. In the ideal case where only variations in overhead pressure exist, the overhead pressure must still be controlled to within +/−2% of the square root of the orifice pressure drop or 0.098 psi. In terms of the overhead pressure this is +/−0.5% which is very difficult to achieve for large gas flows and significant gas volumes above the bed.

In an example of the mixing benefits of the device, 3,000 lb./hr. of a gaseous hydrocarbon were introduced at a velocity of 28.4 fps surrounding eight 1.06 inch conduits 46 conveying solids to the mixing zone 53 at the rate of 16.7 lb./sec. The solids were introduced at 1,750° F. while the hydrocarbon was introduced at 1,000° F. At a distance of 3 feet from entry of the mixing zone 53, the hydrocarbon had reached an average conversion of 60%.

I claim:

1. A process for continually feeding particulate solids to a reaction chamber comprising the steps of:
   a. providing a bed of solids in a non-fluidized state;
   b. delivering aeration gas under pressure to a localized section of the bed of solids immediately above a conduit extending from the bed of solids to a reaction zone, said aeration gas having a flow rate less than a rate necessary for incipient fluidization of the bed of solids such that only the solids proximate to said conduit are fluidized; and
   c. passing the fluidized solids downwardly by gravity through the conduit to the reaction chamber.

2. A process as in claim 1 wherein the solids bed has a bed height of about 10 feet, a bed density of about 43 pounds per cu. ft. and wherein the aeration gas is delivered at the rate of about 47.2 ACFM.

3. A process as in claim 1 wherein solids are rapidly and intimately admixed with a fluid feed in the reaction chamber comprising the further step of:
   introducing said fluid feed into the downwardly flowing solids at the outlet end of said conduit in the reaction chamber from an orifice located peripherally around the opening of the conduit facing the reaction chamber.

4. A process as recited in claim 3 further comprising the step of delivering the fluid feed into the downwardly flowing solids from an orifice located peripherally around the reaction chamber.

5. A process as in claim 4 further comprising a step of delivering a second flow of fluid feed at an angle to the downwardly flowing solids, from a location peripherally around the first fluid feed.

6. A process as recited in claim 3 wherein the fluid feed is a hydrocarbon to be thermally cracked in the reaction chamber.

* * * * *